Jan. 6, 1931. E. K. LORING 1,788,311
ROLLER BEARING BOXING FOR LAUNDRY EXTRACTORS
Filed Jan. 10, 1928
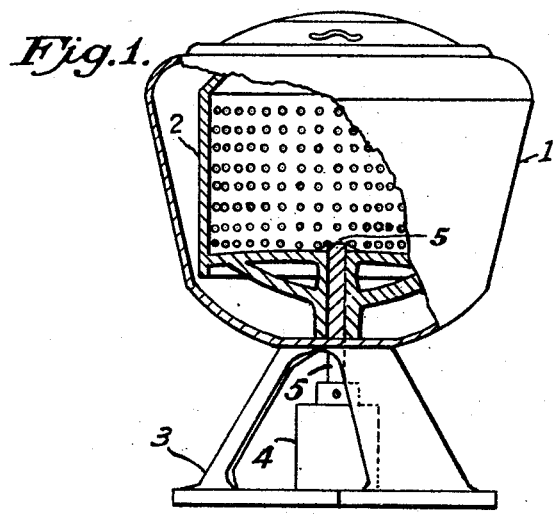
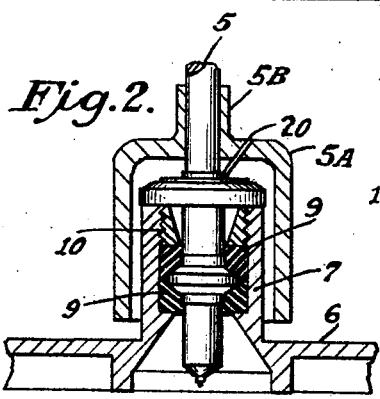
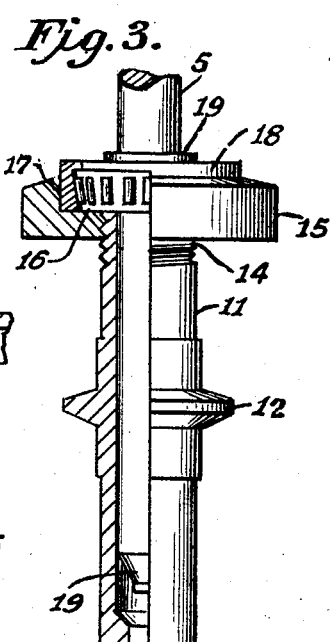
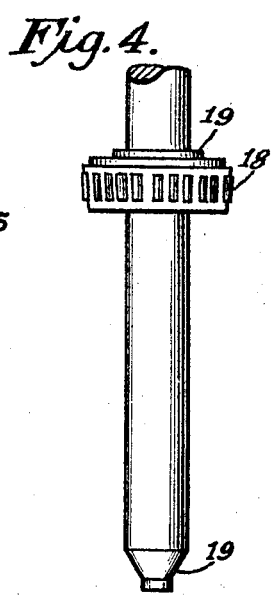
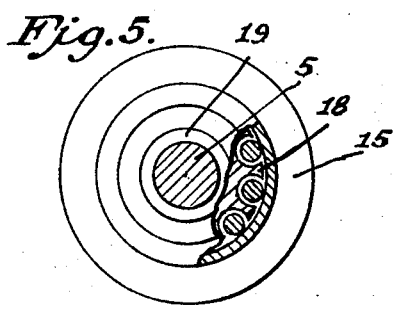
Inventor
Edward K. Loring
By Clarence A. O'Brien
Attorney Patented Jan. 6, 1931

1,788,311

UNITED STATES PATENT OFFICE

EDWARD K. LORING, OF YANKTON, SOUTH DAKOTA

ROLLER-BEARING BOXING FOR LAUNDRY EXTRACTORS

Application filed January 10, 1928. Serial No. 245,780.

This invention relates generally to bearing boxing and particularly to roller bearing boxing for laundry extractors and the like.

The present practice of mounting extractor shafts is to provide a reduced pointed or rounded end on the shaft which turns upon a hardened steel plate. This arrangement develops a considerable amount of friction and is not susceptible of efficient lubrication, a large amount of power is necessary to start the extractors and to keep them running at effective speed. A very considerable waste of power and of time results from the amount of power and elapsed time consumed between the start and the building up of the effective speed.

It is an object of this invention to provide a roller bearing boxing for supporting rotatable extractor shafts which requires much less power and time for attaining the effective speed and less power for maintaining said speed.

It is an object of this invention to provide improved roller bearing boxings for supporting the lower ends of said mentioned rotatable shafts which will very greatly reduce said friction and result in a saving in power and in time required to bring such a structure to its effective speed.

Another object of the invention provides an arrangement of this kind which is simple and inexpensive to construct, may quickly be installed on the usual type of extractor and without extensive and expensive alteration.

These and other objects, the nature of the invention, its composition and arrangement and combination of parts may be readily understood by anyone acquainted with the art to which the invention relates by consulting the following description and the drawings, in which:

Figure 1 is a general view partly in section of an extractor showing a bearing boxing on the lower end of its shaft, Figure 2 is a vertical central section of the casing spaced of the boxing, Figure 3 is a cross sectional view of the elements confined within said casing, Figure 4 is a view of the extractor shaft having mounted thereon a roller bearing supported in the manner of my invention and Figure 5 is a top view of Figure 3 partly cut away showing the disposition of the roller bearing.

I do not desire to limit the application of this invention to the particular modification set forth herein and in illustration thereof and any change or changes may be made in the structure or material consistent with the spirit and scope of the invention.

Referring in detail to the drawings the numeral 1 represents generally the outer casing of an extractor having a rotatable member 2 therein supported on a base 3 and the numeral 4 designates the placement of my improved roller bearing boxing.

Referring to Figure 2 it will be seen that I provide a base portion 6 having a tubular standard 7 and shoulders 8, said shoulders 8 partly closing the bottom thereof and adapted to maintain therein a rubber body 9 adapted to act as a washer and another rubber body 9 similarly adapted to act as a washer.

The upper portion of the tubular standard 7 is internally screw threaded to receive an externally screw threaded ring 10 which is adapted to be screwed down upon the washer 9 to maintain the desired adjustment. Retained by the washers 9 is an upright tubular casing 11 having intermediate its ends a projecting flange portion 12 which rests upon one of the washers 9 and is retained by the other of the washers 9 and adjusted and retained in this position by the action of the ring 10.

The casing 11 has a clean out plug 13 in its bottom, the said casing is adapted to accommodate an oil bath. The exterior of the upper end of the casing 11 is screw threaded and thereon is threaded a wide collar 15 provided with the annulus 16 forming the shoulder 17 for reception of the roller bearing 18. Roller bearing 18 is adapted to receive and support the entire weight exerted through the shaft 5 on which is secured a bushing forming a jammed fit to support said roller bearing 18 thereon in a position to support the bottom end 20 on the shaft 5 at some distance above the clean out plug 13 in the interior of the casing 11. Oil to the bearing surrounding the shaft is to be conveyed thereto into the guard casing 5a.

The wide collar 15 is adjusted to rest upon the upper edges of the standard 7 and to extend at least to its outer surface to prevent oil escaping around the bearing entering the inside of the standard to come into deteriorating contact with the rubber washers.

It will be seen that the entire force exerted by the shaft 5 is carried by the roller bearing 18 and extended to the annulus 16 of the wide collar 15 which is in turn supported in the casing 11, said casing 11 being supported in rubber washers 9 by the projection of the flange 12, and the rubber washer and the shoulders 8 of the standard which is supported by the base member 6.

The casing 5a may be adapted to rotate with the shaft and conceal and protect the mechanism described, and it is of bell shape having a collar 5b for attaching to the shaft.

It has been found in actual practice that the installation of a bearing of this type results in a saving of a great deal of power and enables the obtaining of effective speed by the extractor in thirty or forty seconds sooner than is usually obtainable. It is also obvious that the bearing boxing of the type described is more durable and requires fewer replacements than the usual type mentioned. It is further adjustable to compensate for wear and the character of work being done.

Thus it is evident that I have provided a device of the character described, which is simple to install and operate, which is inexpensive and simple in construction, which is otherwise admirably suited for the purposes for which it is designed.

I claim:

1. A shaft support of the class described comprising in combination, a base formed with a tubular standard, a shaft boxing extended therein, a recess bearing cap adjustably carried at the upper end of the boxing and seated upon the upper edge of the standard for supporting the boxing, said boxing and cap being open at its upper end for receiving a shaft end and a roller bearing assembly carried by the shaft and seated in the recess of said cap whereby to support the shaft with its lower end suspended in the boxing and adapted to automatically compensate wear in the bearing assembly by gravitation.

2. A shaft support of the class described comprising in combination, a base formed with a tubular standard, a shaft boxing extended therein having its upper end open for receiving a shaft end and having a drain plug provided in its lower end, a bearing cap adjustably carried at the upper end of the boxing with its lower edge seated upon the upper edge of the standard for supporting the boxing and having an annular recess formed in its upper surface and a roller bearing assembly carried by the shaft and seated in said recess whereby to support the shaft with its lower end suspended in the boxing and adapted to automatically compensate wear in the bearing assembly by gravitation.

3. A bearing boxing for shaft ends comprising a hollow body open at one end for receiving the shaft and provided with a threaded plug at its opposite end and a bearing cap threaded upon the open end of the boxing for vertical adjustment and having a central opening for the insertion of the shaft, said opening being enlarged at the outer surface of the cap for receiving a bearing assembly carried by the shaft and said cap providing means for suspending the boxing upon the supporting structure whereby to support the shaft with its lower end suspended in the boxing and adapted to automatically compensate wear in the bearing assembly by gravitation.

EDWARD K. LORING.